(12) United States Patent
Cao (10) Patent No.: US 8,744,499 B2
(45) Date of Patent: Jun. 3, 2014

(54) MOBILE TERMINAL AND MULTIMEDIA MESSAGING SERVICE NOTIFICATION MESSAGE PROCESSING METHOD

(75) Inventor: Gang Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 140 days.

(21) Appl. No.: 13/258,433

(22) PCT Filed: Apr. 21, 2010

(86) PCT No.: PCT/CN2010/071953
§ 371 (c)(1),
(2), (4) Date: Jun. 21, 2012

(87) PCT Pub. No.: WO2010/148731
PCT Pub. Date: Dec. 29, 2010

(65) Prior Publication Data
US 2012/0258694 A1 Oct. 11, 2012

(30) Foreign Application Priority Data
Dec. 24, 2009 (CN) .......................... 2009 1 0189356

(51) Int. Cl.
*H04W 4/00* (2009.01)
(52) U.S. Cl.
USPC ........ 455/466; 455/414.1; 455/415; 455/418; 370/328; 379/88.12; 379/88.11; 379/88.19; 379/88.22; 709/202; 709/203
(58) Field of Classification Search
USPC .............................. 455/466, 414.1, 415, 418; 370/328–338; 379/88.12, 88.11, 88.19, 379/88.22; 709/202, 203
See application file for complete search history.

(56) References Cited

U.S. PATENT DOCUMENTS

| 6,654,786 B1 | 11/2003 | Fox et al. |
| 7,171,222 B2 | 1/2007 | Fostick |

(Continued)

FOREIGN PATENT DOCUMENTS

| CN | 1960516 A | 5/2007 |
| CN | 101036403 A | 9/2007 |

(Continued)

OTHER PUBLICATIONS

International Search Report in international application No. PCT/CN2010/071953, mailed on Oct. 8, 2010.

(Continued)

*Primary Examiner* — Quan M Hua
(74) *Attorney, Agent, or Firm* — Oppedahl Patent Law Firm LLC (57) ABSTRACT

The disclosure provides a mobile terminal (10), which comprises: a storage module (101), configured to store a linked list that includes a service ID and a reception time of a Multimedia Messaging Service (MMS) notification message, and a maximum length of the linked list; an inquiry module (102), configured to inquire whether there is a service ID identical with a service ID of a received MMS notification message in the linked list when the MMS notification message is received; a length determination module (103), configured to determine whether a length of the linked list is smaller than the maximum length when there is no service ID of the received MMS notification message in the linked list; a time difference determination module (104), configured to determine whether the time difference between the reception time and the last node in the linked list is greater than the time difference between the first node and the last node in the linked list when the length of the linked list is smaller than the maximum length; and a linked list modification module (105), configured to determine whether to insert the service ID and the reception time of the MMS notification message into the linked list as a node. The disclosure also provides an MMS notification message processing method. The disclosure increases the inquiry efficiency of the linked list.

23 Claims, 3 Drawing Sheets

(56) References Cited

U.S. PATENT DOCUMENTS

| | | |
|---|---|---|
| 7,610,043 B2 * | 10/2009 | Bae .................. 455/412.2 |
| 2002/0078228 A1 * | 6/2002 | Kuisma et al. ............... 709/237 |
| 2004/0063449 A1 | 4/2004 | Fostick |
| 2006/0166651 A1 * | 7/2006 | Kim ..................... 455/412.1 |
| 2007/0100951 A1 | 5/2007 | Bae |
| 2007/0124383 A1 | 5/2007 | Hebert et al. |
| 2007/0298770 A1 | 12/2007 | Lee et al. |
| 2009/0106374 A1 | 4/2009 | Easwar et al. |

FOREIGN PATENT DOCUMENTS

| | | |
|---|---|---|
| CN | 101110800 A | 1/2008 |
| CN | 101163259 A | 4/2008 |
| CN | 101247538 A | 8/2008 |
| CN | 101304561 A | 11/2008 |
| EP | 1655915 A1 | 5/2006 |
| EP | 1783971 A1 | 5/2007 |
| WO | 2009089793 A1 | 7/2009 |

OTHER PUBLICATIONS

English Translation of the Written Opinion of the International Search Authority in international application No. PCT/CN2010/071953, mailed on Oct. 8, 2010.

Supplementary European Search Report in European application No. 10791237.0, mailed on Oct. 9, 2013.

* cited by examiner

MOBILE TERMINAL AND MULTIMEDIA MESSAGING SERVICE NOTIFICATION MESSAGE PROCESSING METHOD

TECHNICAL FIELD

The disclosure relates to the mobile communication field and in particular to a method for a mobile terminal to process a Multimedia Messaging Service (MMS) notification message in a mobile communication system.

BACKGROUND

MMS is a short message service for transmitting multimedia information introduced by mobile operators through using Wireless Application Protocol (WAP) as a carrier. MMS may realize the instant transmission of multimedia information from a mobile phone to a mobile phone, or from a mobile phone to Internet, or from Internet to a mobile phone. As the most important feature, MMS supports multimedia function and can transmit information in various multimedia formats, such as: text, image, audio and video. MMS can transmit not only the basic text information in Short Messaging Service (SMS), but also the multimedia content such as image, audio, cartoon, vibration, video, etc. Further, MMS can also transmit sports news with pictures of scenes, interesting cartoons and animations, greeting cards with rich content, wonderful animation games and other application contents.

At present, most mobile phones support MMS. MMS mainly includes reception and transmission, management, and play of multimedia messages. Reception of multimedia messages is a complex process. In this process, firstly it needs the MMS center to send a PUSH message to the mobile phone, informing the user that there is a multimedia message in the MMS center. If the user selects to receive, the mobile phone will resolve a Uniform/Universal Resource Locator (URL) of this multimedia message from the PUSH message, and initiate a download request to the MMS center via the URL address. Then the MMS center will send the multimedia message to the mobile phone via WAP link. Therefore, the PUSH message is also called MMS notification message. Typically, in order to ensure that a user can receive an MMS notification message, the MMS center will send the same MMS notification message to the user at a fixed interval until the MMS center receives an acknowledgement message indicating successful download of the multimedia message by the user. Typically, if the user sets the mobile phone in a mode of immediate download of the multimedia message and the network condition is good, the mobile phone will not receive any repeated MMS notification message once it receives the multimedia message. However, if the user sets the mobile phone in a mode of delayed download of the multimedia message or the download is failed due to poor network condition, the mobile phone may receive repeated MMS notification message. Therefore, after the mobile phone receives a repeated MMS notification message, typically the mobile phone needs to perform message reprocessing. The conventional method is to save the service ID of the previously received MMS notification messages in the mobile phone, put the ID in a linked list file and meanwhile set the maximum length of the linked list. When an is MMS notification message is received, the service ID of this MMS notification message will be resolved and compared with the service ID in each node of the linked list. If an identical ID is found, the message will be deemed as a repeated message and be rejected. If no identical ID is found, it will be deemed that a new MMS notification message is received and the user will be reminded of inserting this new service ID into the linked list file. In the conventional method, it can hardly solve the following problems: how to set the maximum node quantity of the linked list that saves service IDs. If the quantity is too large, the overhead of the storage space of the system will be increased, the inquiry performance will be weakened and the timeliness will be affected, but if the quantity is too small, some repeated notification messages may be omitted. Under this technical background, the disclosure provides a new self-adaptive method to effectively solve this problem.

SUMMARY

The object of the disclosure is to provide a mobile terminal and an MMS notification message processing method to solve the problems that the maximum length of the linked list in the prior art is set as a fixed value, and the storage space of the system will be increased and the inquiry efficiency of the linked list will be lowered when the fixed value is too large, while repeated MMS notification messages may be omitted when the fixed value is too small.

The disclosure provides a mobile terminal, which includes: a storage module, configured to store a linked list which includes a service ID and a reception time of a Multimedia Messaging Service (MMS) notification message, and a maximum length of the linked list; an inquiry module, configured to inquire whether there is a service ID identical with a service ID of a received MMS notification message in the linked list when the MMS notification message is received; a length determination module, configured to determine whether a length of the linked list is smaller than the maximum length when there is no service ID identical with the service ID of the received MMS notification message in the linked list; a time difference determination module, configured to determine whether a time difference between the reception time and a last node in the linked list is greater than a time difference between a first node and the last node in the linked list when the length of the linked list is smaller than the maximum length; a linked list modification module, configured to determine whether to insert the service ID and the reception time of the MMS notification message into the linked list as a node according to determination results of the length determination module and/or the time difference determination module.

Preferably, the linked list modification module may be further configured to insert the service ID and the reception time of the MMS notification message into the linked list as a node when the length determination module determines that the length of the linked list is smaller than the maximum length, and the time difference determination module determines that the time difference between the reception time and the last node in the linked list is greater than the time difference between the first node and the last node in the linked list.

Preferably, the linked list modification module may be further configured to delete the first node in the linked list, and insert the service ID and the reception time of the MMS notification message into the linked list as a node when the length determination module determines that the length of the linked list is smaller than the maximum length, and the time difference determination module determines that the time difference between the reception time and the last node in the linked list is smaller than the time difference between the first node and the last node in the linked list.

Preferably, the linked list modification module may be further configured to delete the first node in the linked list, and insert the service ID and the reception time of the MMS notification message into the linked list as a node when the length determination module determines that the length of the linked list is greater than the maximum length.

Preferably, the linked list may further include a minimum length; the length determination module may be further configured to determine relations of the length of the linked list with the minimum length and the maximum length; the linked list modification module may be further configured to insert the service ID and the reception time of the MMS notification message into the linked list as a node when the length of the linked list is smaller than the minimum length.

Preferably, the linked list modification module may further configured to insert the service ID and the reception time into the linked list as a node when the length determination module determines that the length of the linked list is greater than the minimum length but smaller than the maximum length, and the time difference determination module determines that the time difference is greater than the time difference between the first node and the last node in the linked list.

Preferably, the linked list modification module may be further configured to delete the first node in the linked list and insert the service ID and the reception time of the MMS notification message into the linked list as a node when the length determination module determines that the length of the linked list is greater than the minimum length but smaller than the maximum length, and the time difference determination module determines that the time difference is smaller than the time difference between the first node and the last node in the linked list.

The disclosure further provides an MMS notification message processing method, which includes: setting a maximum length of a linked list which includes a service ID and a reception time of an MMS notification message; and the method further includes: inquiring whether there is a service ID identical with a service ID of a received MMS notification message in the linked list when the MMS notification message is received; when there is no identical service ID, determining whether a length of the linked list is smaller than a maximum length; when the length of the linked list is smaller than the maximum length, further determining whether a time difference between a reception time of the MMS notification message and a last node in the linked list is greater than a time difference between a first node and the last node in the linked list; when the time difference is greater than the time difference between the first node and the last node in the linked list, inserting the service ID and the reception time of the MMS notification message into the linked list as a node.

Preferably, the MMS notification message processing method may further include: deleting the first node in the linked list, and inserting the service ID and the reception is time of the MMS notification message into the linked list as a node when the length of the linked list is smaller than the maximum length, and the time difference between the reception time and the last node in the linked list is smaller than the time difference between the first node and the last node in the linked list.

Preferably, the MMS notification message processing method may further include: setting a minimum length of the linked list, and determining relations of the length of the linked list with the minimum length and the maximum length; and inserting the service ID and the reception time of the MMS notification message into the linked list as a node when the length of the linked list is smaller than the minimum length.

Preferably, the method may further include: determining the time difference between the reception time of the MMS notification message and the last node in the linked list when the length of the linked list is greater than the minimum length but smaller than the maximum length; and inserting the service ID and the reception time of the MMS notification message into the linked list as a node when the time difference is greater than the time difference between the first node and the last node in the linked list.

Preferably, the MMS notification message processing method may further include: determining the time difference between the reception time of the MMS notification message and the last node in the linked list when the length of the linked list is greater than the minimum length but smaller than the maximum length; and deleting the first node in the linked list, and inserting the service ID and the reception time of the MMS notification message into the linked list as a node when the time difference is smaller than the time difference between the first node and the last node in the linked list.

The disclosure may decide whether to insert a node by determining whether the time difference between the reception time of the MMS notification message and the last node in the linked list is greater than the time difference between the first node and the last node in the linked list when the length of the linked list is smaller than the maximum length, thereby solving the following problems in the prior art: whether to insert a node is determined only based on the maximum length of the linked list, and the storage space of the system will be increased and the inquiry efficiency of the linked list will be lowered when the fixed value is too large, while repeated MMS notification messages may be omitted when the fixed value is too small.

DETAILED DESCRIPTION

The technical scheme of the disclosure will be further described below in detail by referring to the accompanying drawings and embodiments, from which those skilled in the art may know and implement the disclosure in a better way. The embodiments are not intended to limit the disclosure.

Figure 1:
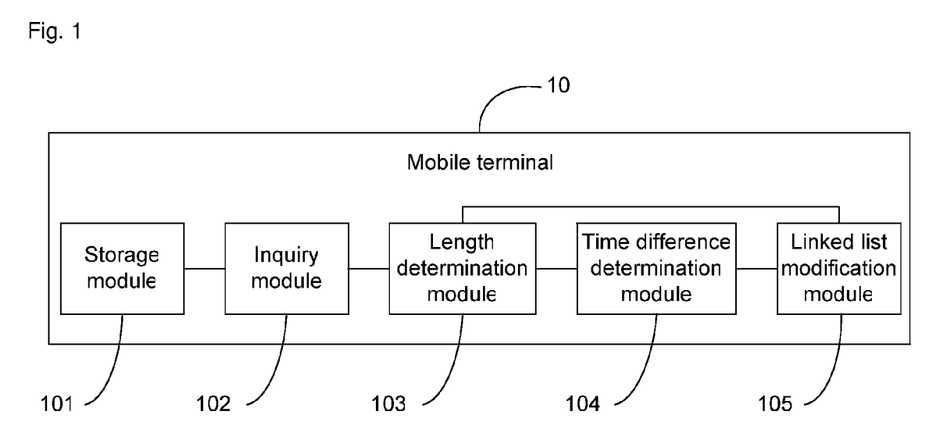
FIG. 1 is a schematic structural diagram of an embodiment of the mobile terminal according to the disclosure.

FIG. 1 is a schematic structural diagram of an embodiment of the mobile terminal according to the disclosure.

The mobile terminal 10 in the embodiment of the disclosure includes a storage module 101, an inquiry module 102, a length determination module 103, a time difference determination module 104 and a linked list modification module 105.

The storage module 101 is configured to store a linked list, which includes the service ID and the reception time of an MMS notification message, and the maximum length of the linked list. Specifically, the storage module 101 stores a linked list, and the linked list saves information of the MMS notification messages received by the mobile terminal 10 and information of the length of the linked list.

The linked list in this embodiment has a plurality of nodes. Each node records the service IDs and reception time of the received MMS notification messages. Further, the nodes are arranged in a order based on the reception time of MMS notification is messages, and the latest received MMS notification message is arranged at the end of the linked list. The specific format of the linked list is as shown in Table 1.

TABLE 1

| Node No. | Service ID of MMS notification message | Reception time of MMS notification message T |
|---|---|---|
| Node 1 | ID1 | T1 |
| Node 2 | ID2 | T2 |
| ... | ... | ... |
| Node m | IDm | Tm |

In Table 1, node 1 is the first node in the linked list, and node m denotes the maximum length of the linked list. T1 is the reception time of the MMS notification message whose service ID is ID1 and the rest can be deduced by analogy. The inquiry module 102 is configured to inquire whether there is a service ID identical with the service ID of the received MMS notification message in the linked list when the MMS notification message is received.

The length determination module 103 is configured to determine whether the length of the linked list is smaller than the maximum length when there is no identical service ID of the received MMS notification message in the linked list.

The time difference determination module 104 is configured to determine whether the time difference between the reception time and the last node in the linked list is greater than the time difference between the first node and the last node in the linked list when the length of the linked list is smaller than the maximum length.

The linked list modification module 105 is configured to determine whether to insert the service ID and the reception time of the MMS notification message into the linked list as a node according to the determination results of the length determination module 103 and/or the time difference determination module 104.

Preferably, when the length determination module 103 determines that the length of the linked list is smaller than the maximum length and the time difference determination module 104 determines that the time difference between the reception time and the last node in the linked list is greater than the time difference between the first node and the last node in the linked list, the linked list modification module 105 will insert the service ID and the reception time of the MMS notification message into the linked list as a node.

Preferably, when the length determination module 103 determines that the length of the linked list is smaller than the maximum length and the time difference determination module 104 determines that the time difference between the reception time and the last node in the linked list is smaller than the time difference between the first node and the last node in the linked list, the linked list modification module 105 will delete the first node in the linked list, and insert the service ID and the reception time of the MMS notification message into the linked list as a node.

Preferably, when the length determination module 103 determines that the length of the linked list is greater than the maximum length, the linked list modification module 105 will delete the first node in the linked list, and insert the service ID and the reception time of the MMS notification message into the linked list as a node.

The embodiment may decide whether to insert a node by determining whether the time difference between the reception time of the MMS notification message and the last node in the linked list is greater than the time difference between the first node and the last node in the linked list when the length of the linked list is smaller than the maximum length, thereby solving the following problems in the prior art: whether to insert a node is determined only based on the maximum length of the linked list, such that the storage space of the system will be increased and the inquiry efficiency of the linked list will be lowered if the fixed value is too large, while repeated MMS notification messages may be omitted if the fixed value is too small.

Further, the linked list according to the disclosure also includes a minimum length. The specific format of the linked list is as shown in Table 2.

TABLE 2

| Node No. | Service ID of MMS notification message | Reception time of MMS notification message T |
|---|---|---|
| Node 1 | ID1 | T1 |
| Node 2 | ID2 | T2 |
| ... | ... | ... |
| Node n | IDn | Tn |
| ... | ... | ... |
| Node m | IDm | Tm |

In table 2, node 1 is the first node in the linked list, the rest can be deduced by is analogy, node n is the $n^{th}$ node in the linked list, n denotes the minimum length of the linked list, and node m denotes the maximum length of the linked list. T1 is the reception time of the MMS notification message whose service ID is ID1 and the rest can be deduced by analogy.

Accordingly, the length determination module 103 is also configured to determine the relations of the length of the linked list with the minimum length and the maximum length; and the linked list modification module 105 is also configured to insert the service ID and the reception time of the MMS notification message into the linked list as a node when the length of the linked list is smaller than the minimum length.

The linked list modification module 105 is also configured to insert the service ID and the reception time into the linked list as a node when the length determination module 103 determines that the length of the linked list is greater than the minimum length but smaller than the maximum length, and the time difference determination module 104 determines that the time difference is greater than the time difference between the first node and the last node in the linked list.

Further, the linked list modification module 105 is also configured to delete the first node in the linked list, and insert the service ID and the reception time of the MMS notification message into the linked list as a node when the length determination module 103 determines that the length of the linked list is greater than the minimum length but smaller than the maximum length, and the time difference determination module 104 is determines that the time difference is smaller than the time difference between the first node and the last node in the linked list.

The embodiment may decide whether to insert a node by determining whether the time difference between the reception time of the MMS notification message and the last node in the linked list is greater than the time difference between the first node and the last node in the linked list when the length of the linked list is greater than the minimum length but smaller than the maximum length, thereby solving the following problems in the prior art: whether to insert a node is determined only based on the maximum length of the linked list, such that the storage space of the system will be increased and the inquiry efficiency of the linked list will be lowered if the fixed value is too large, while repeated MMS notification messages may be omitted if the fixed value is too small.

Figure 2:
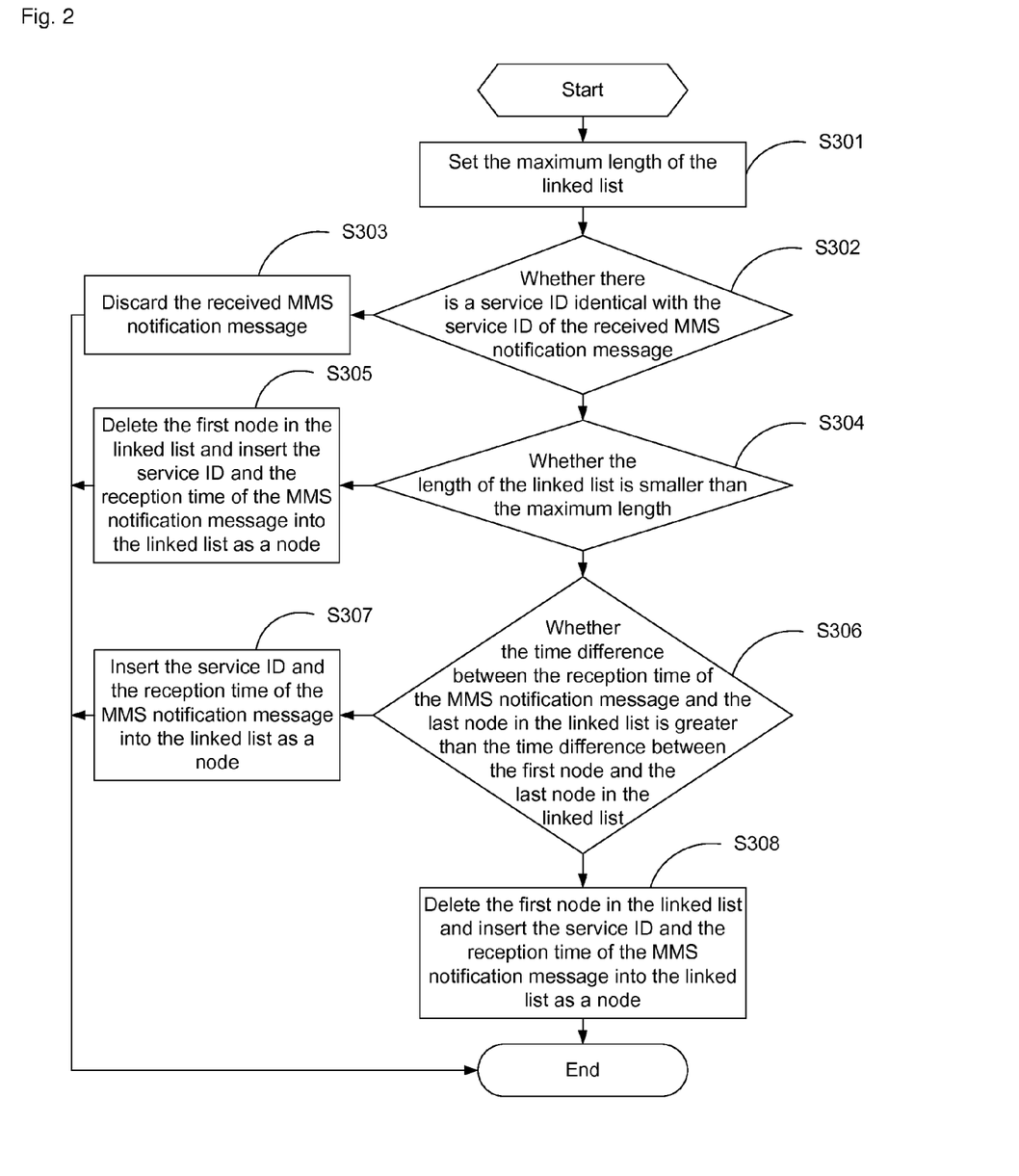
FIG. 2 is a flow chart of an embodiment of the MMS notification message processing method according to the disclosure.

FIG. 2 is a flow chart of an embodiment of the MMS notification message processing method according to the disclosure.

S301: setting a maximum length of the linked list, wherein the linked list includes a service ID and a reception time of an MMS notification message.

S302: inquiring whether there is a service ID identical with the service ID of the received MMS notification message in the linked list when the MMS notification message is received; if yes, executing S303, otherwise executing S304. In this embodiment, the service ID of the received MMS notification message is compared with the service ID of each node in the linked list one by one, to realize inquiry on whether there is a service ID identical with the service ID of the received MMS notification message in the linked list.

S303: discarding the received MMS notification message.

S304: determining whether the length of the linked list is smaller than the maximum length; if yes, executing S306, otherwise executing S305.

S305: deleting the first node in the linked list and inserting the service ID and the reception time of the MMS notification message into the linked list as a node.

S306: determining whether the time difference between the reception time of the is MMS notification message and the last node in the linked list is greater than the time difference between the first node and the last node in the linked list; if yes, executing S307, otherwise executing S308.

S307: inserting the service ID and the reception time of the MMS notification message into the linked list as a node.

S308: deleting the first node in the linked list and inserting the service ID and the reception time of the MMS notification message into the linked list as a node.

The embodiment may decide whether to insert a node by determining whether the time difference between the reception time of the MMS notification message and the last node in the linked list is greater than the time difference between the first node and the last node in the linked list when the length of the linked list is smaller than the maximum length, thereby solving the following problems in the prior art: whether to insert a node is determined only based on the maximum length of the linked list, and the storage space of the system will be increased and the inquiry efficiency of the linked list will be lowered if the fixed value is too large, while repeated MMS notification messages may be omitted if the fixed value is too small.

Figure 3:
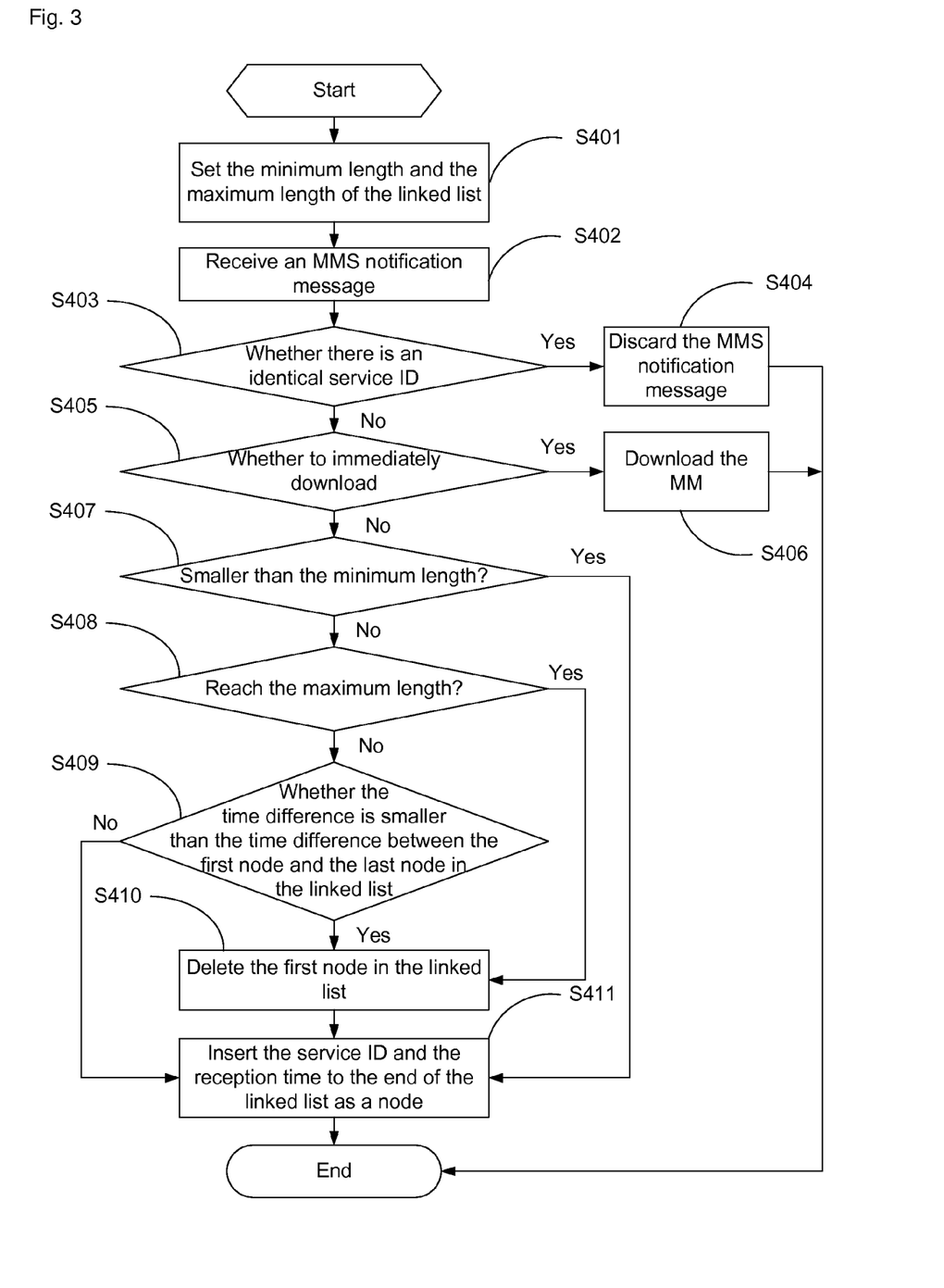
FIG. 3 is a flow chart of another embodiment of the MMS notification message processing method according to the disclosure.

FIG. 3 is a flow chart of another embodiment of the MMS notification message processing method according to the disclosure.

In this embodiment, a minimum length of the linked list is also set. The length of the linked list needs to be compared with not only the maximum length but also the minimum length. The specific steps and the beneficial effect are described below.

S401: setting the minimum length and the maximum length of the linked list.

S402: receiving an MMS notification message.

S403: inquiring whether there is a service ID identical with the service ID of the received MMS notification message in the linked list; if yes, executing S404, otherwise, executing S405.

S404: discarding the MMS notification message.

S405: determining whether to immediately download the multimedia message; if is yes, executing S406, otherwise executing S407.

S406: downloading the multimedia message.

S407: determining whether the length of the linked list is smaller than the minimum length; if yes, executing S411, otherwise executing S408.

S408: determining whether the length of the linked list reaches the maximum length; if yes, executing S410, otherwise executing S409.

S409: determining whether the time difference between the reception time of the MMS notification message and the last node in the linked list is smaller than the time difference between the first node and the last node in the linked list; if yes, executing S410, otherwise executing S411.

S410: deleting the first node in the linked list.

S411: inserting the service ID and the reception time of the MMS notification message into the linked list as a node.

The embodiment may decide whether to insert a node by determining whether the time difference between the reception time of the MMS notification message and the last node in the linked list is greater than the time difference between the first node and the last node in the linked list when the length of the linked list is greater than the minimum length but smaller than the maximum length, thereby solving the following problems in the prior art: whether to insert a node is determined only based on the maximum length of the linked list, and the storage space of the system will be increased and the inquiry efficiency of the linked list will be lowered if the fixed value is too large, while repeated MMS notification messages may be omitted if the fixed value is too small.

The contents described above are preferred embodiments of the disclosure and are not intended to limit the scope of the disclosure. All equivalent structures or equivalent process conversions made by using the content of the prescription and accompanying is drawings of the disclosure, or direct or indirect application of the disclosure in other relevant technical fields shall be included within the scope of the disclosure.

What is claimed is:

1. A mobile terminal, comprising a memory, an inquiry module, a length determination module, a time difference determination module and a linked list modification module, wherein the memory is configured to store a linked list which comprises a service identifier (ID) and a reception time of a Multimedia Messaging Service (MMS) notification message, and a maximum length of the linked list; the inquiry module is configured to inquire whether there is a service ID identical with a service ID of a received MMS notification message in the linked list when the MMS notification message is received; the length determination module is configured to determine whether a length of the linked list is smaller than the maximum length when there is no service ID identical with the service ID of the received MMS notification message in the linked list; the time difference determination module is configured to determine whether a time difference between the reception time and a last node in the linked list is greater than a time difference between a first node and the last node in the linked list when the length of the linked list is smaller than the maximum length; the linked list modification module is configured to determine whether to insert the service ID and the reception time of the MMS notification message into the linked list as a node according to determination results of the length determination module and/or the time difference determination module, wherein the linked list modification module is further configured to insert the service ID and the reception time of the MMS notification message into the linked list as a node when the length determination module determines that the length of the linked list is smaller than the maximum length, and the time difference determination module determines that the time difference between the reception time and the last node in the linked list is greater than the time difference between the first node and the last node in the linked list.

2. The mobile terminal according to claim 1, wherein the linked list modification module is further configured to delete the first node in the linked list, and insert the service ID and the reception time of the MMS notification message into the linked list as a node when the length determination module determines that the length of the linked list is smaller than the maximum length, and the time difference determination module determines that the time difference between the reception time and the last node in the linked list is smaller than the time difference between the first node and the last node in the linked list.

3. The mobile terminal according to claim 1, wherein the linked list modification module is further configured to delete the first node in the linked list, and insert the service ID and the reception time of the MMS notification message into the linked list as a node when the length determination module determines that the length of the linked list is greater than the maximum length.

4. The mobile terminal according to claim 1, wherein the linked list further comprises a minimum length;
the length determination module is further configured to determine relations of the length of the linked list with the minimum length and the maximum length;
the linked list modification module is further configured to insert the service ID and the reception time of the MMS notification message into the linked list as a node when the length of the linked list is smaller than the minimum length.

5. The mobile terminal according to claim 4, wherein the linked list modification module is further configured to insert the service ID and the reception time into the linked list as a node when the length determination module determines that the length of the linked list is greater than the minimum length but smaller than the maximum length, and the time difference determination module determines that the time difference is greater than the time difference between the first node and the last node in the linked list.

6. The mobile terminal according to claim 4, wherein the linked list modification module is further configured to delete the first node in the linked list and insert the service ID and the reception time of the MMS notification message into the linked list as a node when the length determination module determines that the length of the linked list is greater than the minimum length but smaller than the maximum length, and the time difference determination module determines that the time difference is smaller than the time difference between the first node and the last node in the linked list.

7. A Multimedia Messaging Service (MMS) notification message processing method, comprising: setting a maximum length of a linked list which comprises a service identifier (ID) and a reception time of an MMS notification message; the method further comprising: inquiring whether there is a service ID identical with a service ID of a received MMS notification message in the linked list when the MMS notification message is received; when there is no identical service ID, determining whether a length of the linked list is smaller than a maximum length; when the length of the linked list is smaller than the maximum length, further determining whether a time difference between a reception time of the MMS notification message and a last node in the linked list is greater than a time difference between a first node and the last node in the linked list; when the time difference is greater than the time difference between the first node and the last node in the linked list, inserting the service ID and the reception time of the MMS notification message into the linked list as a node.

8. The MMS notification message processing method according to claim 7, further comprising:
deleting the first node in the linked list, and inserting the service ID and the reception time of the MMS notification message into the linked list as a node when the length of the linked list is smaller than the maximum length, and the time difference between the reception time and the last node in the linked list is smaller than the time difference between the first node and the last node in the linked list.

9. The MMS notification message processing method according to claim 7, wherein the method further comprises:
setting a minimum length of the linked list, and determining relations of the length of the linked list with the minimum length and the maximum length; and inserting the service ID and the reception time of the MMS notification message into the linked list as a node when the length of the linked list is smaller than the minimum length.

10. The MMS notification message processing method according to claim 9, wherein the method further comprises:
determining the time difference between the reception time of the MMS notification message and the last node in the linked list when the length of the linked list is greater than the minimum length but smaller than the maximum length; and inserting the service ID and the reception time of the MMS notification message into the linked list as a node when the time difference is greater than the time difference between the first node and the last node in the linked list.

11. The MMS notification message processing method according to claim 9, wherein the method further comprises:
determining the time difference between the reception time of the MMS notification message and the last node in the linked list when the length of the linked list is greater than the minimum length but smaller than the maximum length; and
deleting the first node in the linked list, and inserting the service ID and the reception time of the MMS notification message into the linked list as a node when the time difference is smaller than the time difference between the first node and the last node in the linked list.

12. The mobile terminal according to claim 1, wherein the linked list further comprises a minimum length;
the length determination module is further configured to determine relations of the length of the linked list with the minimum length and the maximum length;
the linked list modification module is further configured to insert the service ID and the reception time of the MMS notification message into the linked list as a node when the length of the linked list is smaller than the minimum length.

13. The mobile terminal according to claim 2, wherein the linked list further comprises a minimum length;
the length determination module is further configured to determine relations of the length of the linked list with the minimum length and the maximum length;
the linked list modification module is further configured to insert the service ID and the reception time of the MMS notification message into the linked list as a node when the length of the linked list is smaller than the minimum length.

14. The mobile terminal according to claim 3, wherein the linked list further comprises a minimum length;
the length determination module is further configured to determine relations of the length of the linked list with the minimum length and the maximum length;
the linked list modification module is further configured to insert the service ID and the reception time of the MMS notification message into the linked list as a node when the length of the linked list is smaller than the minimum length.

15. The mobile terminal according to claim 12, wherein the linked list modification module is further configured to insert the service ID and the reception time into the linked list as a node when the length determination module determines that the length of the linked list is greater than the minimum length but smaller than the maximum length, and the time difference determination module determines that the time difference is greater than the time difference between the first node and the last node in the linked list.

16. The mobile terminal according to claim 13, wherein the linked list modification module is further configured to insert the service ID and the reception time into the linked list as a node when the length determination module determines that the length of the linked list is greater than the minimum length but smaller than the maximum length, and the time difference determination module determines that the time difference is greater than the time difference between the first node and the last node in the linked list.

17. The mobile terminal according to claim 14, wherein the linked list modification module is further configured to insert the service ID and the reception time into the linked list as a node when the length determination module determines that the length of the linked list is greater than the minimum length but smaller than the maximum length, and the time difference determination module determines that the time difference is greater than the time difference between the first node and the last node in the linked list.

18. The mobile terminal according to claim 12, wherein the linked list modification module is further configured to delete the first node in the linked list and insert the service ID and the reception time of the MMS notification message into the linked list as a node when the length determination module determines that the length of the linked list is greater than the minimum length but smaller than the maximum length, and the time difference determination module determines that the time difference is smaller than the time difference between the first node and the last node in the linked list.

19. The mobile terminal according to claim 13, wherein the linked list modification module is further configured to delete the first node in the linked list and insert the service ID and the reception time of the MMS notification message into the linked list as a node when the length determination module determines that the length of the linked list is greater than the minimum length but smaller than the maximum length, and the time difference determination module determines that the time difference is smaller than the time difference between the first node and the last node in the linked list.

20. The mobile terminal according to claim 14, wherein the linked list modification module is further configured to delete the first node in the linked list and insert the service ID and the reception time of the MMS notification message into the linked list as a node when the length determination module determines that the length of the linked list is greater than the minimum length but smaller than the maximum length, and the time difference determination module determines that the time difference is smaller than the time difference between the first node and the last node in the linked list.

21. The MMS notification message processing method according to claim 8, wherein the method further comprises:
   setting a minimum length of the linked list, and determining relations of the length of the linked list with the minimum length and the maximum length; and inserting the service ID and the reception time of the MMS notification message into the linked list as a node when the length of the linked list is smaller than the minimum length.

22. The MMS notification message processing method according to claim 21, wherein the method further comprises:
   determining the time difference between the reception time of the MMS notification message and the last node in the linked list when the length of the linked list is greater than the minimum length but smaller than the maximum length; and inserting the service ID and the reception time of the MMS notification message into the linked list as a node when the time difference is greater than the time difference between the first node and the last node in the linked list.

23. The MMS notification message processing method according to claim 21, wherein the method further comprises:
   determining the time difference between the reception time of the MMS notification message and the last node in the linked list when the length of the linked list is greater than the minimum length but smaller than the maximum length; and
   deleting the first node in the linked list, and inserting the service ID and the reception time of the MMS notification message into the linked list as a node when the time difference is smaller than the time difference between the first node and the last node in the linked list.

\* \* \* \* \*